(12) United States Patent
Lisch et al.

(10) Patent No.: US 11,141,907 B2
(45) Date of Patent: Oct. 12, 2021

(54) FILLING CYLINDER INSERT TO REDUCE VOLUME

(71) Applicant: AMCOR RIGID PACKAGING USA, LLC, Ann Arbor, MI (US)

(72) Inventors: G. David Lisch, Jackson, MI (US); Frederick C. Beuerle, Jackson, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 26 days.

(21) Appl. No.: 16/652,142

(22) PCT Filed: Oct. 2, 2017

(86) PCT No.: PCT/US2017/054689
§ 371 (c)(1),
(2) Date: Mar. 30, 2020

(87) PCT Pub. No.: WO2019/070225
PCT Pub. Date: Apr. 11, 2019

(65) Prior Publication Data
US 2020/0238590 A1   Jul. 30, 2020

(51) Int. Cl.
*B29C 49/46*   (2006.01)
*B29C 49/12*   (2006.01)
*B29K 67/00*   (2006.01)
*B29L 31/00*   (2006.01)
*B65B 3/02*    (2006.01)

(52) U.S. Cl.
CPC ............. *B29C 49/12* (2013.01); *B29C 49/46* (2013.01); *B29C 2049/1238* (2013.01); *B29C 2049/4664* (2013.01); *B29K 2067/003* (2013.01); *B29L 2031/712* (2013.01); *B65B 3/022* (2013.01)

(58) Field of Classification Search
CPC ............ B29C 49/46; B29C 2049/4664; B29C 2049/465; B29C 2049/4655
See application file for complete search history.

(56) References Cited

U.S. PATENT DOCUMENTS

| | | | |
|---|---|---|---|
| 3,813,079 A | 5/1974 | Baumann et al. | |
| 2005/0206045 A1 | 9/2005 | Desanaux et al. | |
| 2010/0136158 A1 | 6/2010 | Andison et al. | |
| 2012/0025423 A1 | 2/2012 | McCready | |
| 2013/0122136 A1 | 5/2013 | Fevre et al. | |
| 2019/0275725 A1* | 9/2019 | Kitzinger | B29C 49/58 |

OTHER PUBLICATIONS

International Search Report and Written Opinion of the ISA issued in PCT/US2017/054689, dated Jun. 27, 2018; ISA/KR.

* cited by examiner

*Primary Examiner* — Robert B Davis
(74) *Attorney, Agent, or Firm* — Harness, Dickey & Pierce, P.L.C.

(57) ABSTRACT

A filling cylinder assembly for a container forming and filling system that simultaneously forms and fills a container from a preform with fluid. The filling cylinder assembly includes a cylinder having an inner wall defining a cavity. A piston head is at a distal end of a piston rod. An insert is configured to be seated in the cavity to provide the cavity with a reduced volume such that with the insert seated within the cavity the cavity has a first volume, and without the insert seated in the cavity the cavity has a second volume that is greater than the first volume.

26 Claims, 6 Drawing Sheets

FILLING CYLINDER INSERT TO REDUCE VOLUME

CROSS-REFERENCE TO RELATED APPLICATION

This application is a U.S. National Phase Application under 35 U.S.C. 371 of International Application No. PCT/US2017/054689 filed on Oct. 2, 2017, the entire disclosure of which is incorporated herein by reference.

FIELD

The present disclosure relates to a filling cylinder assembly for a container forming and filling system that simultaneously forms and fills a container from a preform with fluid.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Existing container forming and filling methods and systems are suitable for their intended use, but are subject to improvement. For example, existing container forming and filling systems pump fluid into a preform to simultaneously form a container from the preform and fill the container with the fluid. The fluid is pumped into the preform from a filling cylinder assembly by a piston, which actuates in a cavity defined by a fill cylinder. Current fill cylinders are dedicated in size corresponding to the size of the container to be formed and filled. Therefore, smaller and larger containers typically require changing the entire filling cylinder assembly, which can be complex and time consuming. The present teachings provide for an improved filling cylinder assembly that addresses these issues in the art, as well as numerous other issues as described herein and as one skilled in the art will appreciate.

SUMMARY

This section provides a general summary of the disclosure, and is not a comprehensive disclosure of its full scope or all of its features.

The present teachings provide for a filling cylinder assembly for a container forming and filling system that simultaneously forms and fills a container from a preform with fluid. The filling cylinder assembly includes a cylinder having an inner wall defining a cavity. A piston head is at a distal end of a piston rod. An insert is configured to be seated in the cavity to provide the cavity with a reduced volume such that with the insert seated within the cavity the cavity has a first volume, and without the insert seated in the cavity the cavity has a second volume that is greater than the first volume.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
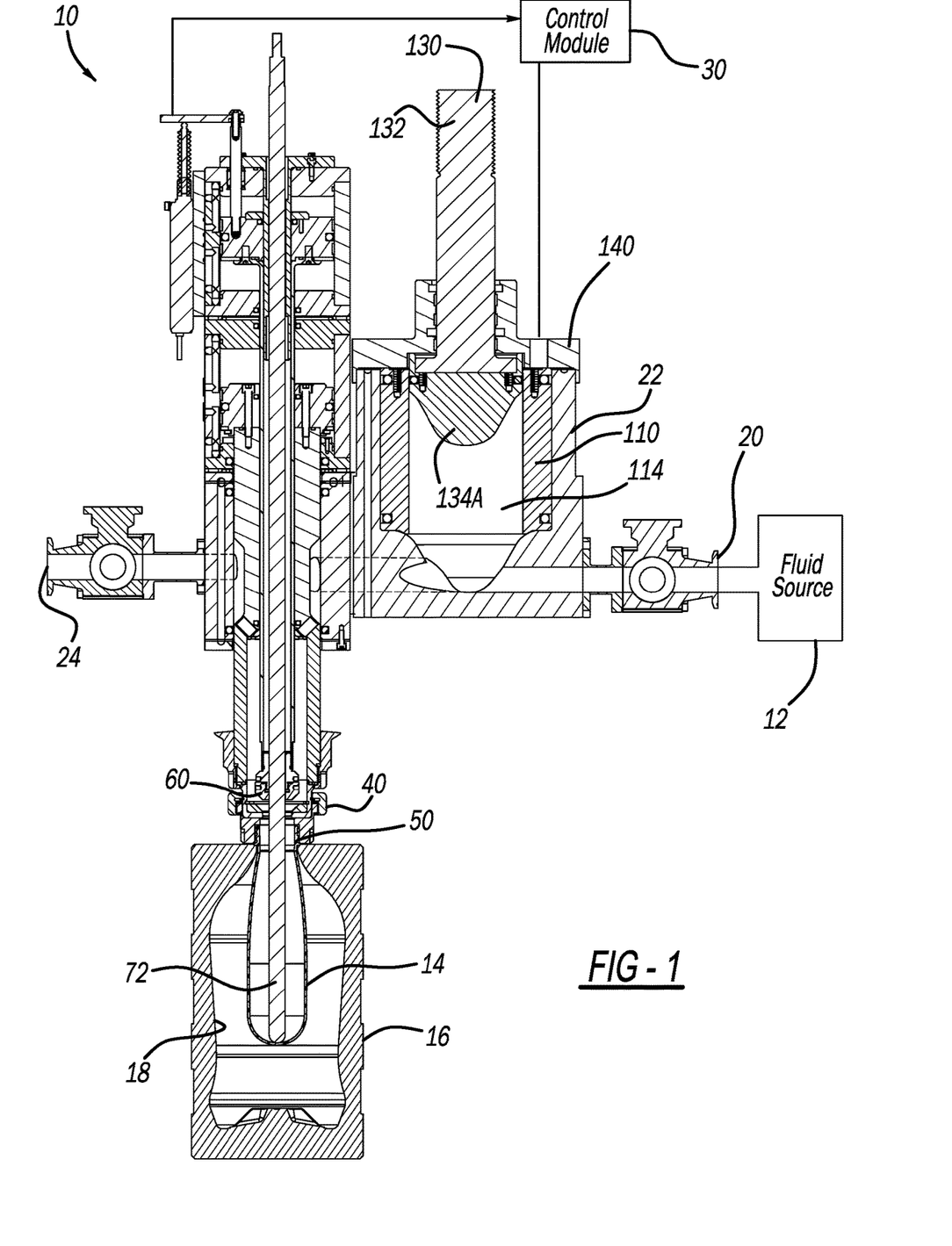
FIG. 1 illustrates a container forming and filling system including a filling cylinder assembly in accordance with the present teachings.

FIG. 1 is a cross-sectional view of a container forming and filling system 10 in accordance with the present teachings. The system 10 can be connected to any suitable fluid source 12 for simultaneously forming and filling any suitable polymeric container from a preform 14. Any suitable fluid can be used. For example, water, juice, flavored drinks, carbonated soda, detergents, oils, chemicals, and the like. The fluid expands the preform 14 within any suitable mold 16, which has an inner mold surface 18 defining any suitable container shape.

Specifically, fluid from the fluid source 12 passes through fluid inlet 20 into a filling/fluid cylinder assembly 22. Excess fluid exits the system 10 through a fluid outlet 24. The filling cylinder assembly 22 controls the fill velocity at which fluid flows into the preform 14. The filling cylinder assembly 22 is controlled by a control module 30.

In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the system 10, and the control module 30 thereof, described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The filling cylinder assembly 22 injects the fluid to a nozzle 40, and specifically to a fluid path defined by a nozzle receptacle of the nozzle 40. Connected to the nozzle 40 is a finish 50 of the preform 14 and the container formed therefrom. The finish 50 defines an opening through which the fluid is injected into the preform 14 and the container formed from the preform 14.

Seated within the nozzle receptacle 42 is a seal pin 60. The seal pin 60 includes a sealing surface, which is arranged opposite to a nozzle sealing surface 46 of the nozzle 40. In a closed position, the seal pin 60 is arranged such that the sealing surface abuts the nozzle sealing surface 46 in order to prevent fluid from flowing through the nozzle 40 and into the preform 14. From the closed position, the seal pin 60 is movable to an open position. When the seal pin 60 is open, the sealing surface is spaced apart from the nozzle sealing surface to define a nozzle passage therebetween. Fluid flowing from the filling cylinder assembly 22 can thus flow through the nozzle passage to the finish 50, and specifically through the opening of the finish 50 in order to form and fill the container from the preform 14.

A stretch rod 72 is included to facilitate stretching of the preform 14 into the mold 16. The stretch rod 72 extends within and beyond the seal pin 60, and is movable independent of the seal pin 60. As fluid is injected into the preform 14, the stretch rod 72 is positioned so as to extend through the finish 50 to a bottom surface of the preform 14, such as is illustrated in FIG. 1.

Figure 2:
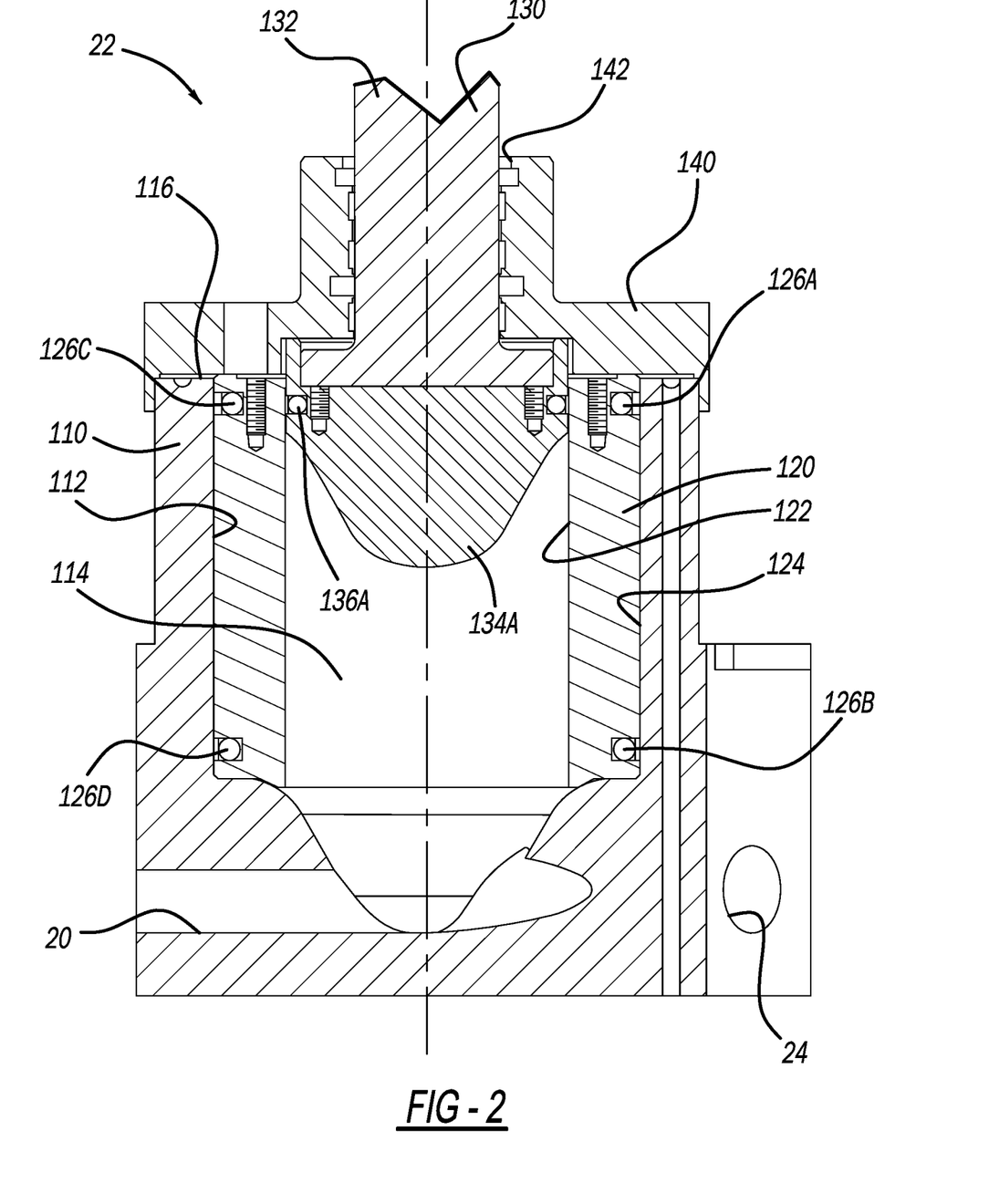
FIG. 2 is a cross-sectional view of the filling cylinder assembly of FIG. 1.

With continued reference to FIG. 1, and additional reference to FIG. 2, the filling cylinder assembly 22 will now be described in additional detail. The assembly 22 includes a filling/fluid cylinder 110, which includes an inner wall 112 defining a cavity 114. The assembly 22 further includes a filling cylinder insert 120, which can be removably seated within the cylinder 110 to change the volume of the cavity 114. For example, when the insert 120 is seated within the cylinder 110, the cavity 114 has a first volume. When the insert 120 is removed from within the cylinder 110, the cavity 114 has a second volume, which is greater than the first volume.

Figure 3:
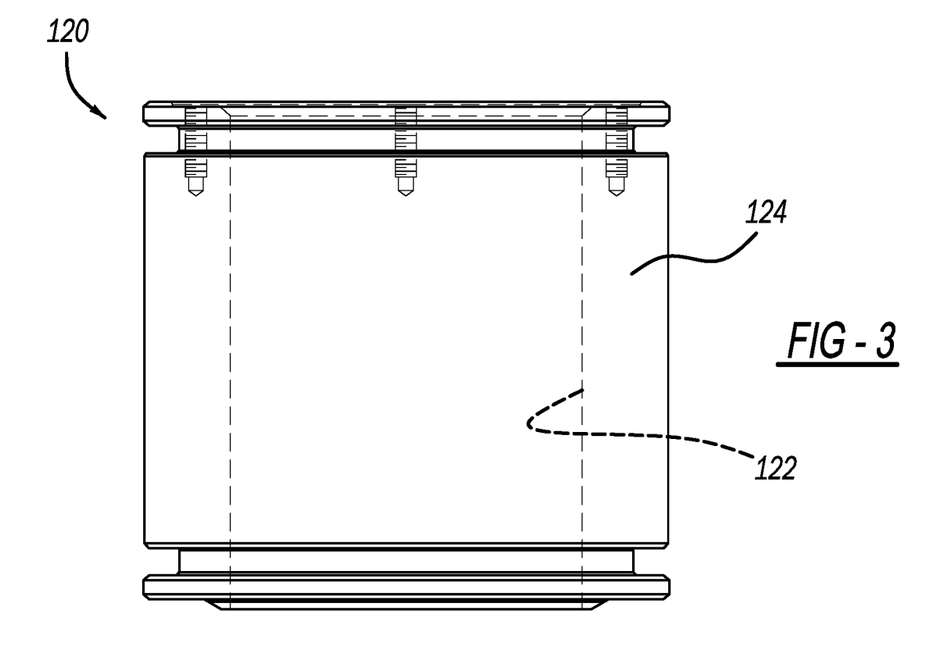
FIG. 3 is a side view of an insert in accordance with the present teachings for the filling cylinder assembly.
Figure 4:
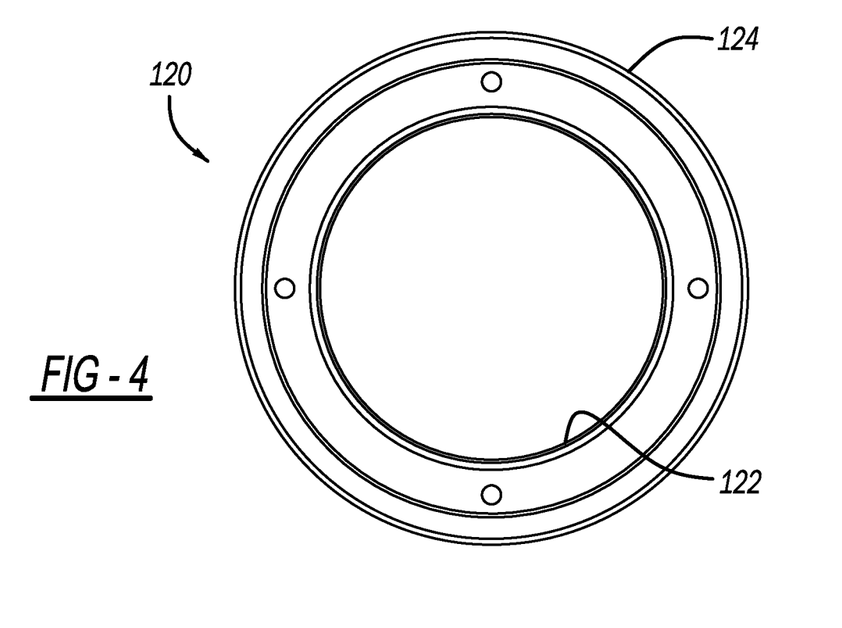
FIG. 4 is a top view of the insert of FIG. 3.

The insert 120 includes an inner surface 122, which is opposite to an outer surface 124. When seated within the cylinder 110, the outer surface 124 abuts the inner wall 112 of the cylinder 110. As illustrated in FIGS. 3 and 4, the insert 120 is generally an annular insert, with both the inner surface 122 and outer surface 124 being generally round or circular. Thus the cavity 114 is generally a round or circular cavity. The insert 120 includes a plurality of seals 126a, 126b, 126c, and 126d, which abut the inner wall 112 of the cylinder 110 when the insert 120 is seated within the cylinder 110 in order to provide a seal between the insert 120 and the cylinder 110.

Figure 5:
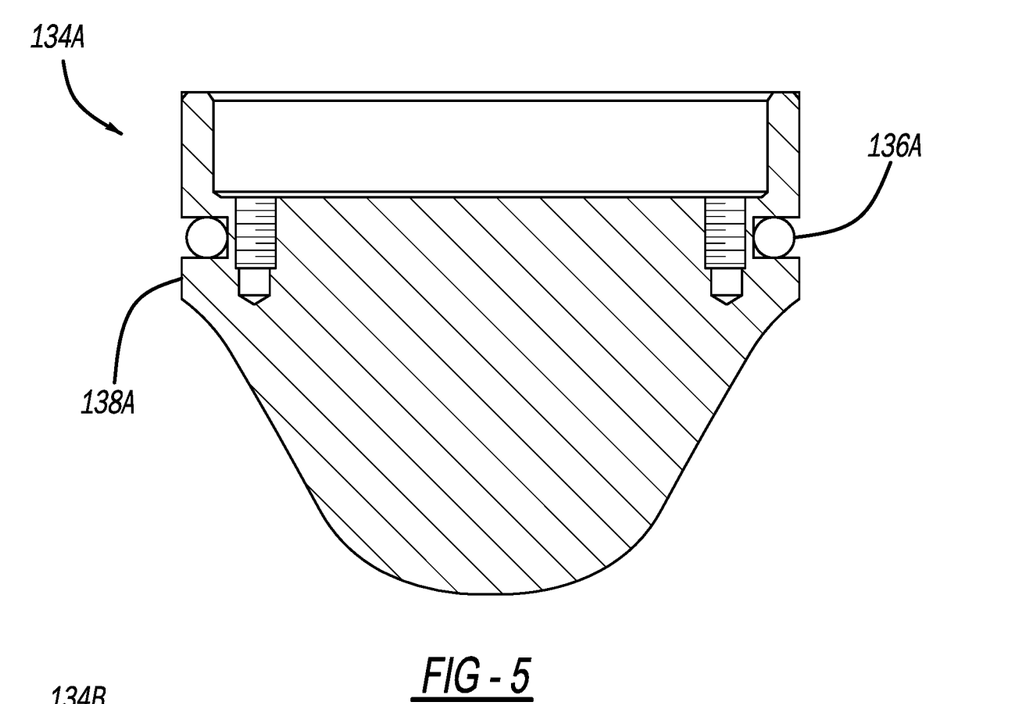
FIG. 5 illustrates a first piston head of a piston assembly for the filling cylinder assembly.
Figure 6:
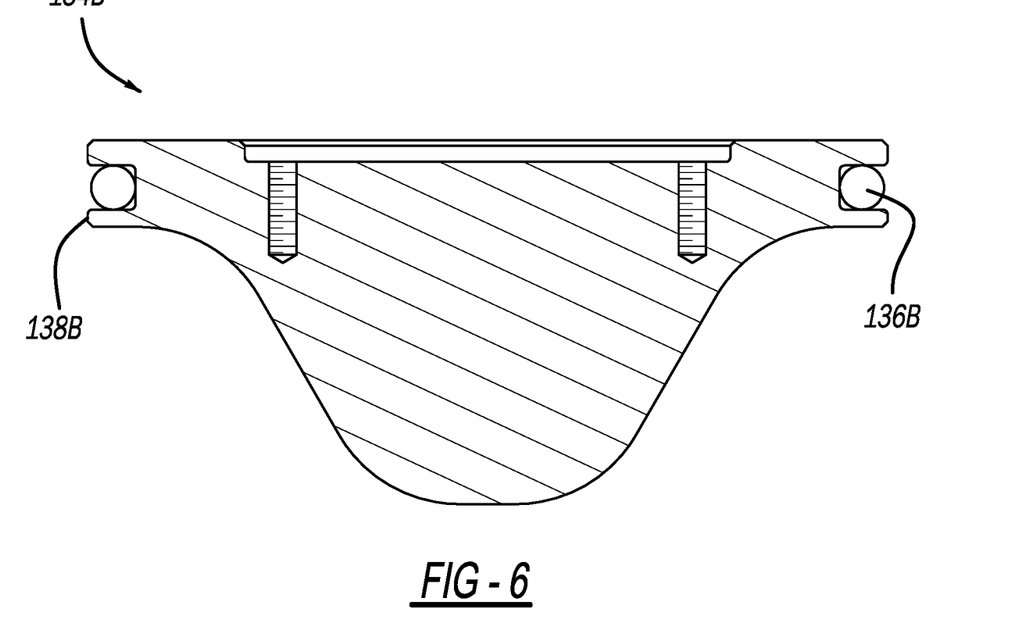
FIG. 6 illustrates a second piston head of the piston assembly.

The assembly 22 further includes a piston rod assembly 130. The piston rod assembly 130 includes a piston rod 132, to which a first piston head 134A (FIGS. 1, 2, and 5) or a second piston head 1346 (FIG. 6) are selectively coupled to. With particular reference to FIG. 5, the first piston head 134A includes a seal 136A, which can be an o-ring, u-cup, or any other suitable seal to provide a seal between the first piston head 134A and the inner surface 122 of the insert 120. The first piston head 134A includes a maximum outer perimeter surface 138A, which is sized and shaped to abut the inner surface 122 of the insert 120. With reference to FIG. 6, the second piston head 134B includes a seal 136B. The seal 136B can be an o-ring, u-cup, or any other seal configured to provide a seal between the second piston head 134B and the inner wall 112 of the cylinder 110. The second piston head 134B has a maximum outer perimeter surface 138B, which is sized and shaped to abut the inner wall 112 of the cylinder 110.

The maximum outer diameter of the outer perimeter surface 138A of the first piston head 134A is smaller than that of the outer perimeter surface 138B the second piston head 134B. Thus when the insert 120 is seated within the cylinder 110, the first piston head 134A is coupled to the piston rod 132, as is illustrated in FIG. 2. When the insert 120 is not seated in the cylinder 110, the second piston head 134B is coupled to the piston rod 132.

The assembly 22 further includes a top plate 140, which is removably coupled to an upper surface 116 of the cylinder 110. The top plate 140 defines a rod bore 142, through which the piston rod 132 extends. The top plate 140 can advantageously be removed from cooperation with the cylinder 110 to allow access to either one of the first piston head 134A or the second piston head 134B coupled to the piston rod 132, and allow one of the first or second heads 134A/134B to be replaced with the other depending on whether or not the insert 120 is seated within the cylinder 110. Being able to remove the top plate 140 also advantageously allows the insert 120 to be seated in, or removed from within, the cylinder 110. Although only a single sized insert 120 is illustrated, the present teachings provide for a plurality of inserts 120 of various different sizes. Similarly, although only two piston heads 134A and 134B are illustrated, any suitable number of piston heads can be provided in order to accommodate different sized inserts 120.

The present teachings advantageously provide for a reduction in volume of the cylinder 110 to enable forming and filling of smaller volume containers. This advantageously reduces changeover and downtime by eliminating the need to replace an entire filling/fluid cylinder assembly 22 to accommodate forming and filling containers of different sizes, and results in a cost savings by not having to acquire and maintain multiple filling/fluid cylinder assemblies 22 of various different sizes on hand to accommodate different size containers. Thus the assembly 22 can advantageously be used to form and fill multiple different container sizes.

The cylinder 110 is sized such that without the insert 120 the cavity 114 has a volume that is 100 ml greater than a maximum capacity of a container to be formed and filled. To form and fill smaller containers, the size of the cavity 114 is reduced by inserting the insert 120 within the cylinder 110. Thus with the insert 120 seated within the cylinder 110, the volume of the cavity 114 will be reduced to a volume that is equal to a maximum volume of a smaller container to be formed and filled, plus 100 ml.

With the insert 120 seated within the cylinder 110, and the first piston head 134A coupled to the piston rod 132, the piston rod assembly 130 has a piston stroke range of 2 inches to 6 inches, and a piston stroke time of 0.2 seconds to 0.4 seconds. The longer piston stroke advantageously allows for more processing time at maximum velocity. More processing time at maximum velocity advantageously allows for higher forming pressure within the container. With the insert 120 seated within the cylinder 110, the piston rod assembly 130 has a maximum velocity range of 400 to 600 mm/s, and a preferred maximum internal container pressure of 30 to 50 bar.

Figure 7:
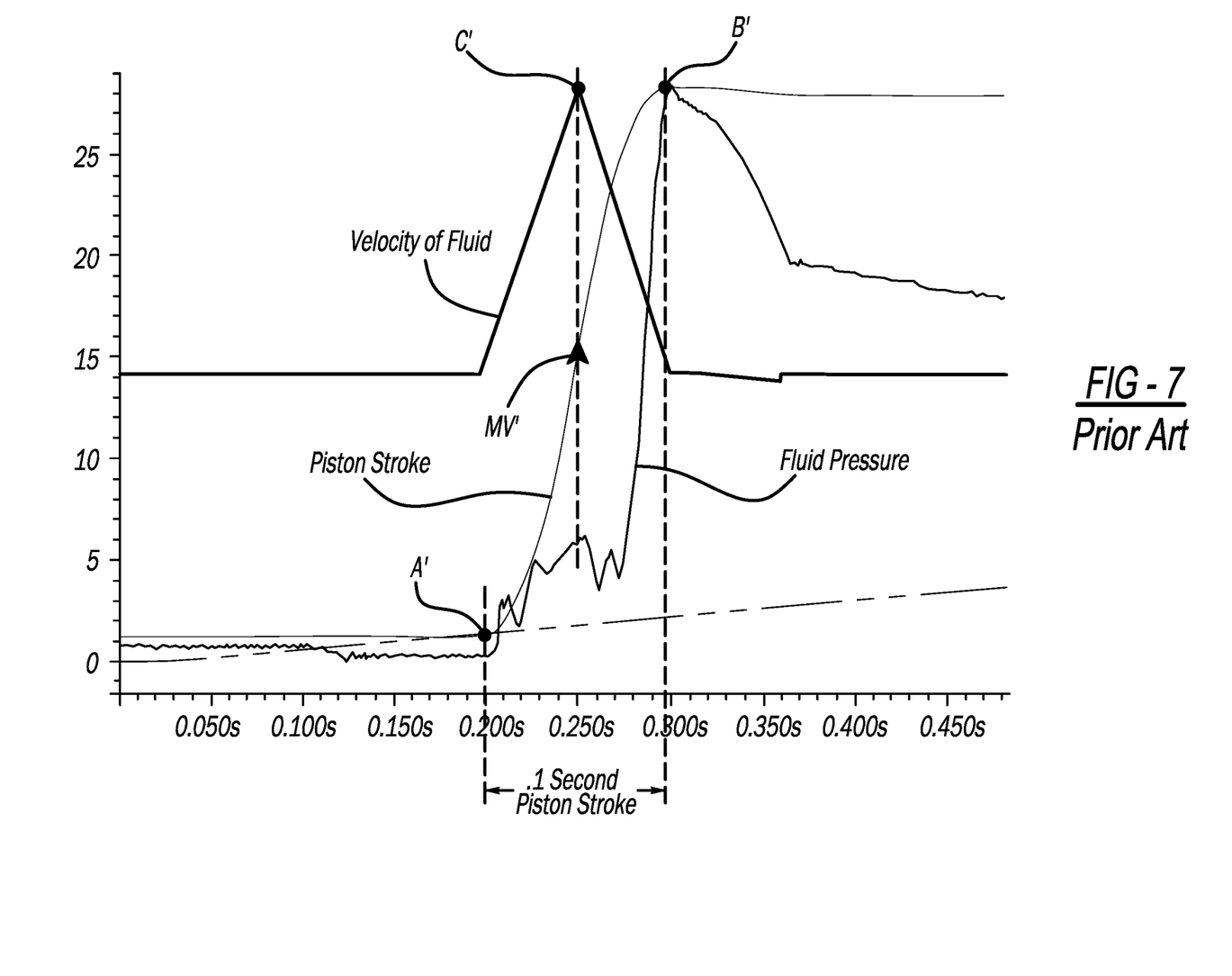
FIG. 7 is plot file for a prior art filling cylinder assembly.
Figure 8:
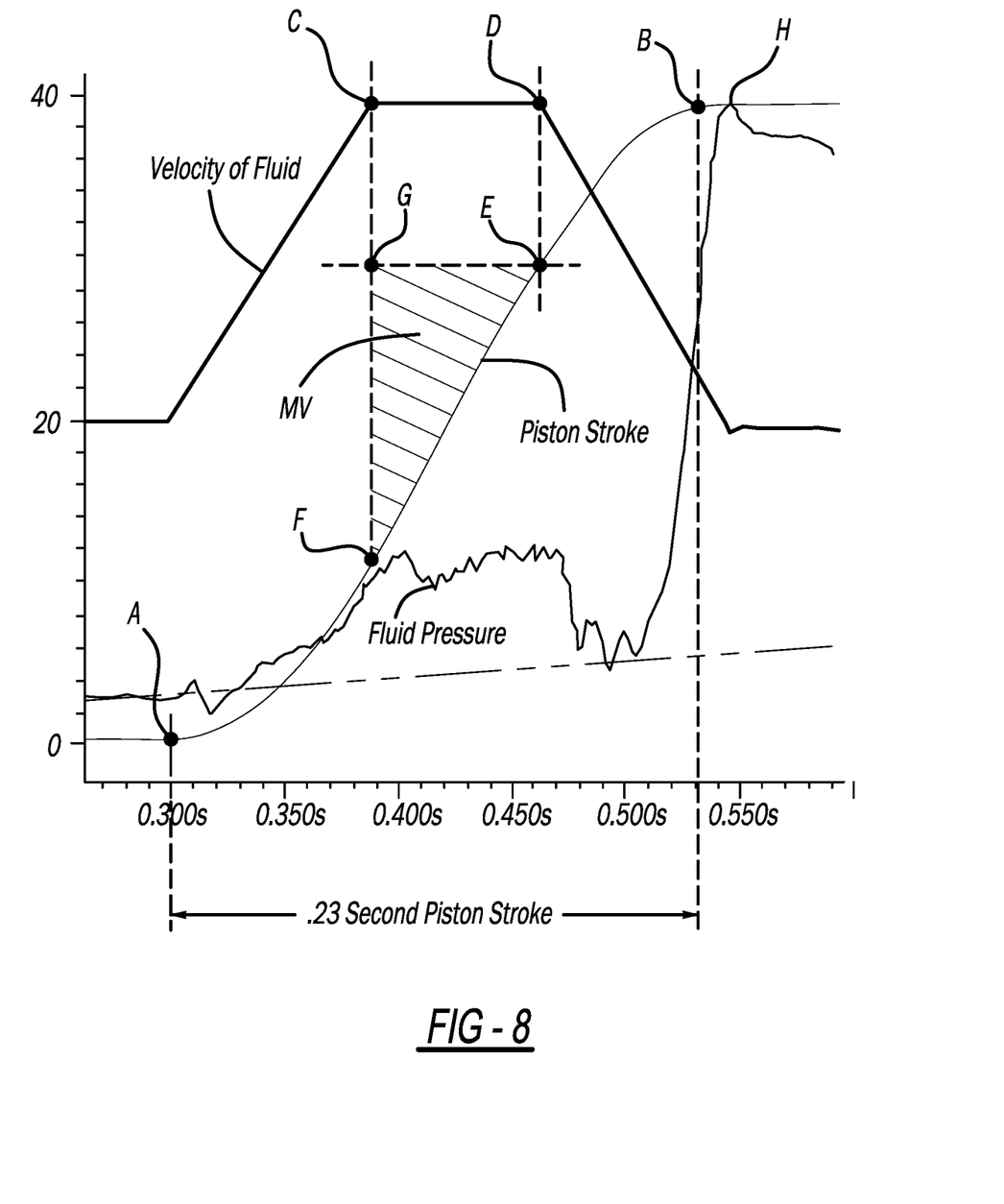
FIG. 8 is an exemplary plot file for a filling cylinder assembly of the present teachings.

FIG. 7 is a plot diagram of an exemplary prior art filling/fluid cylinder assembly, which does not include the filling cylinder insert 120 or the interchangeable piston heads 134A/134B of the present teachings. FIG. 8 is a plot diagram of the filling/fluid cylinder assembly 22 of the present teachings, which includes the insert 120 seated in the cylinder 110, and the first piston head 134A coupled to the piston rod 132. In the plot diagram examples of both FIG. 7 and FIG. 8, the container being formed has the same maximum volume capacity. In other words, FIG. 7 is an exemplary plot diagram corresponding to use of the filling/fluid cylinder assembly 22 to form and fill a smaller sized container of 20 ounces or less without the insert 120 and with the second piston head 134B. FIG. 8 is an exemplary plot diagram corresponding to use of the filling/fluid cylinder assembly 22 to form and fill a container of the smaller size 20 ounces or less with the insert 120 seated within the cylinder 110, and with the first piston head 134A coupled to the piston rod 132.

FIG. 7 illustrates the beginning of the piston stroke at A' and the end of the piston stroke at B'. Thus the piston stroke was about 0.1 seconds in length, and the piston stroke was 23.09 mm (0.9 inches). A maximum velocity set point was 575 mm/s, and actual velocity reached was 428.8 mm/s, as designated at C'. Acceleration and deceleration of fluid was set to 8,000 mm/s$^2$. At B', the maximum pressure set point was 20 bar, and the pressure achieved was 28.3 bar. Thus at maximum velocity, a relatively small process window MV' was achieved.

In contrast to FIG. 7, the maximum velocity MV achieved in accordance with the present teachings at FIG. 8 was substantially larger. The piston stroke time was 0.23 seconds measured between points A and B. The fluid velocity leveled out between points C and D, which is in contrast to prior art FIG. 7 in which the maximum velocity peaked at C', and then rapidly decreased. In the plot diagram of FIG. 8, the maximum velocity set point was 575 mm/s, and the actual velocity reached was 428.8 mm/s. The acceleration and deceleration of fluid was set to 8,000 mm/s$^2$. The piston stroke of the piston rod assembly 130 was 117.6 mm (4.6 inches), which is substantially longer than the piston stroke of FIG. 7. The maximum pressure set point at H was 35 bar, and the pressure achieved was 39.9 bar, which is advantageously greater than the pressure achieved in FIG. 7.

The velocity of fluid in FIG. 8 was advantageously able to reach and maintain the set point for an extended period of time during the piston stroke, which advantageously provides more consistent control of the forming and filling process. The maximum velocity window MV of the fluid is identified by a vertical line extending from point D to the piston stroke line at point E. Another vertical line extends from point C to the piston stroke line at F. A horizontal line is drawn from point E to the vertical line extending between points C and F, and intersects this line at point G. The maximum velocity window of the fluid is defined between points E, F, and G. For example the maximum velocity of the fluid can have a duration of 80 ms to 120 ms, or about 100 ms.

The present teachings thus provide numerous advantages. For example, during the forming and filling sequence, the filling/fluid cylinder assembly 22 requires a processing window with an optimized acceleration and deceleration curve to control the forming and filling process, and achieve the proper internal pressures within the container being formed, and distribute material of the container properly. Using a large cylinder/piston (such as the assembly 22 without the insert 120 and with the second piston head 134B) on a small container (such as 20 ounces or less) results in a shorter cylinder stroke, which is not able to achieve the proper timing and pressures, as illustrated in FIG. 7. The present teachings advantageously provide for the insert 120 and properly sized first piston head 134A for reducing the total volume of the cavity 114, which allows the piston stroke length to increase thereby achieving the proper acceleration and deceleration of the cylinder assembly 22. Thus the assembly 22 can produce containers of various different sizes without having to replace the entire assembly 22, which can increase downtime and changeover costs, and require additional costs associated with having to provide and store a plurality of assemblies 22 for different sized containers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A filling cylinder assembly for a container forming and filling system that simultaneously forms and fills a container from a preform with fluid, the filling cylinder assembly comprising:
    a cylinder having an inner wall defining a cavity;
    a piston rod;
    a piston head at a distal end of the piston rod; and
    an insert configured to be seated in the cavity to provide the cavity with a reduced volume such that with the insert seated within the cavity the cavity has a first volume, and without the insert seated in the cavity the cavity has a second volume that is greater than the first volume.

2. The filling cylinder assembly of claim 1, wherein the maximum velocity of the fluid has a duration of 80 ms to 120 ms, or about 100 ms.

3. The filling cylinder assembly of claim 1, wherein the maximum velocity of the fluid has a duration of about 100 ms.

4. The filling cylinder assembly of claim 1, further comprising a top plate that is removably coupled to an upper portion of the cylinder.

5. The filling cylinder assembly of claim 4, wherein the top plate defines a rod bore, and the piston rod extends through the rod bore.

6. The filling cylinder assembly of claim 1, wherein the piston head is a first piston head, the filling cylinder assembly further comprising a second piston head;
    wherein the first piston head and the second piston head are configured to be removably coupled to the piston rod;
    wherein the first piston head has a first diameter and the second piston head has a second diameter that is greater than the first diameter;
    wherein the first diameter of the first piston head is substantially equal to an inner diameter of the insert such that a first outer perimeter surface of the first piston head abuts an inner surface of the insert when the first piston head is coupled to the piston rod and the insert is seated in the cavity; and
    wherein the second diameter of the second piston head is substantially equal to an inner diameter of the cylinder such that a second outer perimeter surface of the second piston head abuts an inner wall of the cylinder when the second piston head is coupled to the piston rod and the cavity is without the insert.

7. The filling cylinder assembly of claim 1, further comprising a plurality of seals at an outer surface of the cylinder.

8. The filling cylinder assembly of claim 1, further comprising a seal at an outer perimeter surface of the piston head.

9. The filling cylinder assembly of claim 1, wherein the piston rod and the piston head are included with a piston assembly having a piston stroke within a range of 5.08 cm to 15.24 cm.

10. The filling cylinder assembly of claim 1, wherein the piston rod and the piston head are included with a piston assembly having a stroke time of 0.2 to 0.4 seconds.

11. The filling cylinder assembly of claim 1, wherein the piston rod and the piston head are included with a piston assembly having a maximum velocity within the range of 400 to 600 mm/s.

12. The filling cylinder assembly of claim 1, wherein the filling cylinder assembly is configured to provide the container with a maximum internal pressure of 30 to 50 bar.

13. The filling cylinder assembly of claim 1, wherein the first volume of the cavity is equal to a first container volume plus 100 ml of a first container filled and formed by the container forming and filling system;
    wherein the second volume of the cavity is equal to a second container volume plus 100 ml of a second container filled and formed by the container forming and filling system; and
    wherein the second container volume is greater than the first container volume.

14. A filling cylinder assembly for a container forming and filling system that simultaneously forms and fills a container from a preform with fluid, the filling cylinder assembly comprising:
    a cylinder having an inner wall defining a cavity;
    a top plate that is removably coupled to an upper portion of the cylinder, the top plate defines a rod bore;
    a piston rod extending through the rod bore;
    a first piston head configured to be coupled to a distal end of the piston rod, the first piston head has a first diameter;
    a second piston head configured to be coupled to the distal end of the piston rod, the second piston head has a second diameter that is greater than the first diameter;
    an insert configured to be seated in the cavity to provide the cavity with a reduced volume such that with the insert seated within the cavity the cavity has a first volume, and without the insert seated in the cavity the cavity has a second volume that is greater than the first volume;
    wherein when forming and filling a first container with a first capacity that is less than a second capacity of a second container, the insert is seated within the cavity to provide the cavity with the first volume, and the first piston head is coupled to the piston rod; and
    wherein when forming the second container with the second capacity that is greater than the first capacity of the first container, the insert is not seated within the cavity to provide the cavity with the second volume that is greater than the first volume.

15. The filling cylinder assembly of claim 14, wherein the maximum velocity of the fluid has a duration of 80 ms to 120 ms, or about 100 ms.

16. The filling cylinder assembly of claim 14, wherein the maximum velocity of the fluid has a duration of about 100 ms.

17. The filling cylinder assembly of claim 14, wherein:
the piston rod and the first piston head are included with a piston assembly having a piston stroke within a range of 5.08 cm to 15.24 cm;
the piston assembly has a stroke time of 0.2 to 0.4 seconds;
the piston assembly has a maximum velocity within the range of 400 to 600 mm/s;
the filling cylinder assembly is configured to provide the container with a maximum internal pressure of 30 to 50 bar; and
the first volume of the cavity with the insert seated therein is 100 ml greater than the first capacity of the first container.

18. A method for simultaneously forming and filling containers with fluid using a container forming and filling system, the method comprising:
forming and filling a first container having a first volume by pumping fluid into a first preform with a filling cylinder assembly having a piston assembly that actuates in a cavity having an insert that provides the cavity with a first volume;
removing the insert from within the cavity to make the cavity larger and thereby provide the cavity with a second volume that is greater than the first volume; and
forming and filling a second container having a second volume that is greater than the first volume by pumping fluid into a second preform with the filling cylinder assembly having the piston assembly that actuates in the cavity having the second volume.

19. The method for simultaneously forming and filling containers of claim 18, wherein the maximum velocity of the fluid has a duration of 80 ms to 120 ms, or about 100 ms.

20. The method for simultaneously forming and filling containers of claim 18, wherein the maximum velocity of the fluid has a duration of about 100 ms.

21. The method of claim 18, further comprising:
forming and filling the first container by pumping fluid into the first preform with the piston assembly including a first piston head mounted to a piston rod;
disconnecting the first piston head from the piston rod;
connecting a second piston head to the piston rod, the second piston head has a second diameter that is greater than a first diameter of the first piston head;
forming and filling the second container by pumping fluid into the second preform with the piston assembly including the second piston head mounted to the piston rod.

22. The method of claim 18, further comprising forming and filling the first container by pumping fluid into the first preform with a piston stroke range of 5.08 cm to 15.24 cm of the piston stroke assembly.

23. The method of claim 18, further comprising forming and filling the first container by pumping fluid into the first preform with a piston stroke time of 0.2 to 0.4 seconds of the piston stroke assembly.

24. The method of claim 18, further comprising forming and filling the first container by pumping fluid into the first preform with a maximum piston velocity range of 400 to 600 mm/s for the piston stroke assembly.

25. The method of claim 18, further comprising forming and filling the first container with a maximum internal container pressure of 30 to 50 bar.

26. The method of claim 18, wherein the first volume is 100 ml greater than a capacity of the first container; and
wherein the second volume is 100 ml greater than a capacity of the second container.

* * * * *